United States Patent Office.

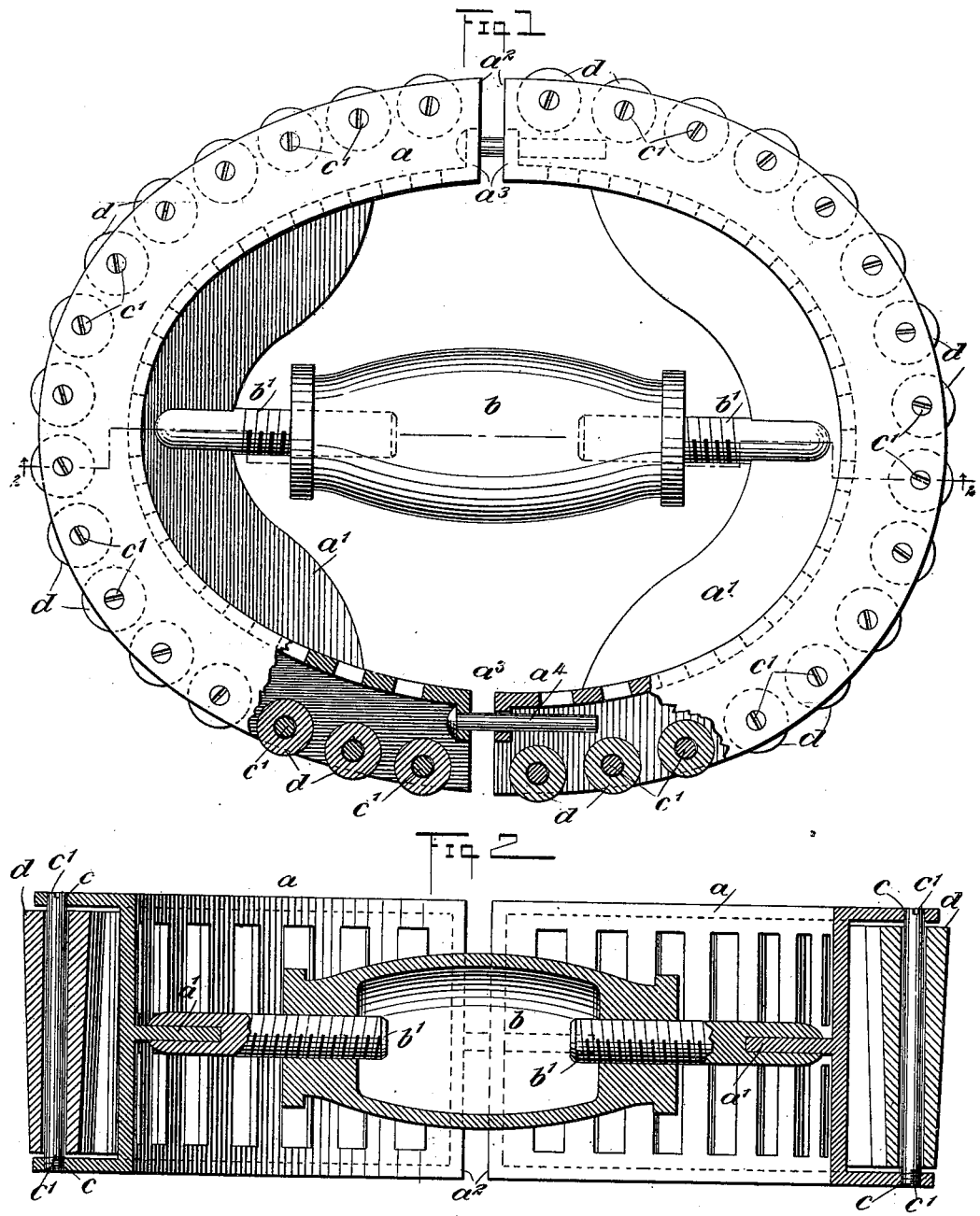

JOHN FRANCIS KENNEFICK, OF CRIPPLE CREEK, COLORADO.

HAT-STRETCHER.

SPECIFICATION forming part of Letters Patent No. 667,019, dated January 29, 1901.

Application filed August 17, 1900. Serial No. 27,178. (No model.)

*To all whom it may concern:*

Be it known that I, JOHN FRANCIS KENNEFICK, a citizen of the United States, and a resident of Cripple Creek, in the county of Teller and State of Colorado, have invented new and useful Improvements in Hat-Stretchers, of which the following is a full, clear, and exact description.

The invention relates to an improvement in stretchers adapted to stretch a hat to conform to the size of a person's head; and the object of the invention is to provide a stretcher that may be simply and easily manipulated and which will readily stretch a hat, exerting the strain equally in all directions, and which may be cheaply constructed and is not liable to get out of order.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in both views.

Figure 1 is a broken plan view of a stretcher embodying my invention, and Fig. 2 is a sectional side elevation on the line 2 2 of Fig. 1.

The blocks $a$ are of the usual segmental form and comprise upper and lower walls, an inner wall, and rollers $d$ interposed between the upper and lower walls and projecting beyond the peripheries thereof.

The coupling and manipulating device consists of a hollow handle member $b$, which has its ends internally threaded and adapted to receive the threaded ends of screw members $b'$, one having a right and the other a left thread, the outer ends of which screw members are slotted to receive lateral flanges $a'$, extending from the interior of the blocks $a$. The opposing end walls $a^2$ of the blocks $a$ have apertures $a^3$ near the inner walls thereof, through which apertures guide-pins $a^4$ are adapted to extend. The guide-pins $a^4$ have heads at one end and are fitted tightly or otherwise made fast at the headed ends to the end walls $a^2$ of one of the blocks $a$, the opposite ends of the pins being free to extend through the apertures in the opposing end walls, and by the use of the guide-pins the blocks will be prevented from getting out of proper alinement.

The upper and lower walls of the blocks $a$ have apertures $c$, the walls of the apertures in the lower wall being threaded and adapted to receive the threaded ends of the pins $c'$. The opposite ends of the pins extend through the apertures in the upper wall and are slotted to provide for the insertion and removal of the same by the use of a screw-driver or like tool.

The rollers $d$ are tapered and are placed between the upper and lower walls of the blocks $a$, forming, practically, the outer walls of the block $a$ and giving a rolling contact with the inside of the hat, the rollers $d$ being held in place by the pins $c'$, which serve as axles and upon which the rollers $d$ are free to revolve.

Having thus described my invention, I claim as new and desire to secure by Letters Patent—

1. A hat-stretcher having its outer or bearing surface composed of rollers.

2. A hat-stretcher having rollers projecting beyond the periphery thereof.

3. A hat-stretcher having tapered rollers projecting beyond the periphery thereof.

4. A hat-stretcher comprising sections having outwardly-projecting top and bottom walls, and vertical rollers mounted to rotate between the said walls.

In testimony whereof I have signed my name to this specification in the presence of two subscribing witnesses.

JOHN FRANCIS KENNEFICK.

Witnesses:
R. LYNES,
CHARLES FRANK HELLSTERN.